United States Patent
Shore et al.

(10) Patent No.: US 9,536,012 B2
(45) Date of Patent: Jan. 3, 2017

(54) PRESENTATION OF THE MEDIA CONTENT ON MOBILE DEVICES

(75) Inventors: Maurice Bennett Shore, Carlisle, MA (US); Thomas William Schneider, Winchester, MA (US); William Frederick Kiefer, III, Cambridge, MA (US); Cassandra Lynn Doll, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1273 days.

(21) Appl. No.: 13/311,234

(22) Filed: Dec. 5, 2011

(65) Prior Publication Data

US 2013/0145306 A1  Jun. 6, 2013

(51) Int. Cl.
*G06F 3/00* (2006.01)
*G06F 9/00* (2006.01)
*G06F 17/00* (2006.01)
*G06F 17/30* (2006.01)

(52) U.S. Cl.
CPC ............... *G06F 17/30905* (2013.01)

(58) Field of Classification Search
CPC ........ G06F 9/4443; G06F 8/34; G06F 3/0481; G06F 3/0482; G06F 8/38; G06F 3/04847; G06F 17/30905; G06F 3/0486; H04N 1/00389; H04N 1/00411
USPC ....... 715/760, 762, 763, 765, 830, 831, 833, 715/834, 835, 836, 838, 863, 865, 864
See application file for complete search history.

(56) References Cited

U.S. PATENT DOCUMENTS

| | | | |
|---|---|---|---|
| 6,968,511 B1* | 11/2005 | Robertson et al. | 715/835 |
| 7,979,785 B1* | 7/2011 | Wang | G06F 17/30905 715/200 |
| 2002/0033848 A1* | 3/2002 | Sciammarella | G06F 3/0481 715/838 |
| 2002/0035697 A1* | 3/2002 | McCurdy et al. | 713/200 |
| 2005/0033657 A1* | 2/2005 | Herrington et al. | 705/26 |
| 2006/0129973 A1 | 6/2006 | Newcorn et al. | |
| 2006/0242554 A1* | 10/2006 | Gerace | G06F 17/30867 715/209 |
| 2007/0186180 A1* | 8/2007 | Morgan | 715/779 |
| 2008/0082903 A1 | 4/2008 | McCurdy et al. | |
| 2009/0228774 A1 | 9/2009 | Matheny et al. | |
| 2009/0303257 A1* | 12/2009 | Yamaguchi | 345/667 |

(Continued)

OTHER PUBLICATIONS

"Editions by AOL," Editions.com, accessed at http://www.editions.com/main, accessed on Apr. 30, 2012, AOL Inc., 2011, 10 pages.

(Continued)

*Primary Examiner* — Tadeese Hailu
*Assistant Examiner* — Anita D Chaudhuri
(74) *Attorney, Agent, or Firm* — Patent Law Works LLP

(57) ABSTRACT

A system, computer-implemented method and computer-readable medium for generating a magazine edition menu, is provided. Dimensions of a display screen on a mobile device are determined. Based on the dimensions, the size of an edition preview pane is determined, where the edition preview pane displays multiple images from the magazine editions. Based on the dimensions the size of a thumbnail section is determined, the thumbnail section displays a plurality of thumbnail editions associated with each magazine edition. Based on the size of the thumbnail section and a number of magazine editions, a layout of the plurality of thumbnail editions on a display screen is determined.

14 Claims, 13 Drawing Sheets

(56) References Cited

U.S. PATENT DOCUMENTS

| | | | |
|---|---|---|---|
| 2010/0216108 A1* | 8/2010 | Cooperman | G09B 5/062 434/317 |
| 2010/0262912 A1* | 10/2010 | Cha | 715/719 |
| 2011/0060994 A1 | 3/2011 | Maxwell et al. | |
| 2011/0078109 A1* | 3/2011 | Griggs | G06F 17/30572 707/609 |
| 2011/0093788 A1 | 4/2011 | Rutman et al. | |
| 2011/0099071 A1 | 4/2011 | Johnson | |

OTHER PUBLICATIONS

"Livestand from Yahoo!" Internet Archive: Way Back Machine, Livestand.com, accessed at http://web.archive.org/web/20110411234034/http://www.livestand.com/, accessed on May 1, 2012, Yahoo! Inc., Apr. 2011, 1 page.

McCue, Marci, "Flipboard Launches World's First Social Magazine," Flipboard.com, accessed at http://flipboard.com/press/flipboard-launches-worlds-first-social-magazine, accessed on Apr. 30, 2012, dated Jul. 21, 2010, Flipboard Inc., copyright 2010-2012, 3 pages.

"Pulse News," Internet Archive: Way Back Machine, Pulse.me, accessed at http://web.archive.org/web/20110620025137/http://www.pulse.me/, accessed on May 1, 2012, Alphonso Labs, Jun. 2011, 1 page.

* cited by examiner

PRESENTATION OF THE MEDIA CONTENT ON MOBILE DEVICES

BACKGROUND

Users gain access to media content via the Internet or the World Wide Web (or simply the "Web") using websites. In one example, users enter a website address on their mobile devices to access media content. In another example, users may download an application provided by a particular content provider onto their mobile device. The application then presents a user with a media content that is periodically uploaded to the application from a content source provided by the content provider. However, the design, presentation and publication of a media content application can be time consuming and arduous.

Moreover, because computing devices have unique specifications that include different operating platforms, a content provider needs to tailor each application to fit the processing requirements of a particular mobile device. As a result, a content provider needs to develop and maintain multiple applications that perform the same function, so that their content can reach as many users as possible.

BRIEF SUMMARY

Embodiments include a system, computer-implemented method and computer-readable medium for generating a magazine edition menu. Dimensions of a display screen on a mobile device are determined. Based on the dimensions, the size of an edition preview pane is determined, where the candy pane displays images included in magazine editions. Based on the dimensions the size of a thumbnail section is determined, the thumbnail section displays a plurality of thumbnail editions associated with each magazine edition. Based on the size of the thumbnail section and a number of magazine editions, a layout of the plurality of thumbnail editions on a display screen is determined.

Embodiments include a system, computer-implemented method and computer-readable medium for generating a menu for presenting contents of a magazine edition that fills out a display screen of a mobile device. Dimensions of a display screen on a mobile device are determined. A number of sections in the magazine edition are determined. In response to determining that the number of sections is above a predefined threshold, a predefined number of posts from each section are selected. In response to determining that the number of sections is below a predefined threshold, a number of posts form each section based on a predefined function that fills the dimensions of the display screen are selected. A menu is generated that includes a title that corresponds to each selected post and section and is displayed on the mobile device.

Embodiments include a system, computer-implemented method and computer-readable medium for extending functionality of an application control. The application control is overloaded on a mobile device with at least one extended action in the extended action list. The extended action list is activated on the mobile device by receiving a pulling indication on the application control in a vertical or horizontal direction on a display screen of the mobile device. Display the extended action list by receiving a pulling indication. Receive an indication that at least one extended action is selected from the extended action list, and execute the extended action from the extended action list.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1A:
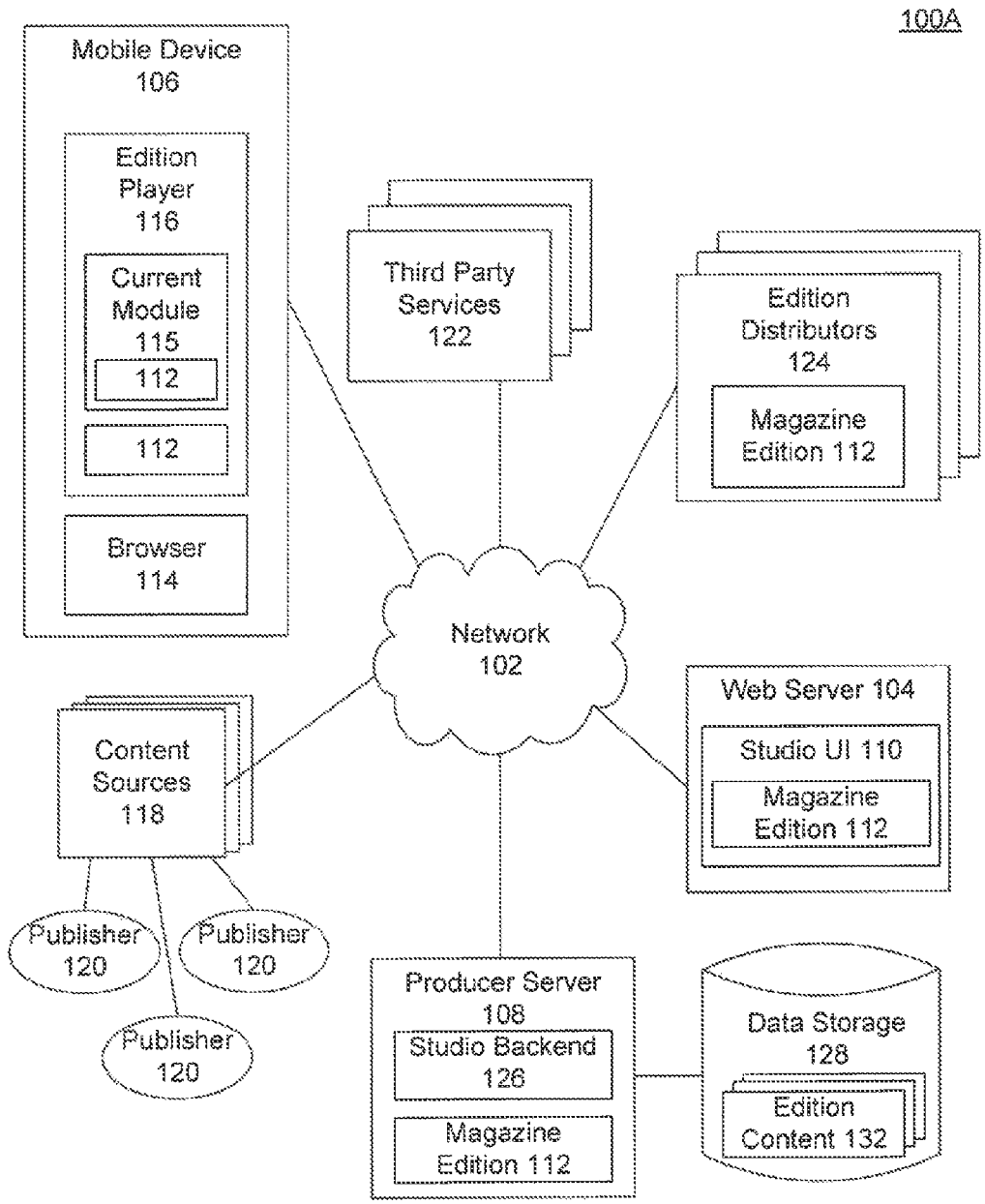
FIG. 1A is a block diagram of a distributed system environment, according to an embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

To avoid multiple versions of the same application, where each version executes on a mobile device having a particular specification, the embodiments of the invention combine media content with templates that format the media content on the mobile device. Additionally, the embodiments of the invention allow for a media content layout on a particular mobile device that is tailored to the dimensions of a particular mobile device.

1. SYSTEM OVERVIEW

FIG. 1A is a block diagram 100A of a distributed system environment. Distributed system environment includes one or more networks 102, web servers 104, producer servers 108 and mobile devices 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services, intermediate web servers, gateways, or other servers may be provided between components of the system shown in FIG. 1, depending upon a particular application or environment.

Web server 104 is a computing, device or an application executing on a computing device that hosts multiple websites. A website is one or more resources associated with a domain name and hosted by one or more web servers 104. An example website is a collection of webpages formatted in hypertext markup language (HTML) that can contain text, images, multimedia content, and programming elements, such as scripts. Web server 104 hosts studio user interface ("UI") 110. Studio UI 110 enables users, such as publishers 120, to design interactive magazine editions 112 that may be distributed to multiple mobile devices 106. Publisher 120 may access studio UI 110 using a web address that is hosted on web server 104. Once accessed, publisher 120 may use studio UI 110 to design the layout of magazine edition 112 and configure content sources 118 for mobile devices 106 having different specifications.

In another embodiment, publisher 120 may download studio UI 110 onto a mobile device 106 as a standalone application or as a plugin or extension to a browser.

Magazine edition 112 may be designed using studio UI 110. Magazine edition 112 displays edition content to users in, for example, a format specified by publishers 120. However, unlike conventional applications that include a separate version for each mobile device having a particular operating platform, edition content displayed using magazine editions 112 may be displayed on mobile devices 106 in a format that is specified by a particular publisher, regardless of the native operating platform particular to mobile device 106. Magazine editions 112 may also layout edition content according to the size of a display screen of mobile device 106.

Mobile device 106 is an electronic device that is under the control of a user and is capable of requesting and receiving resources over network 102. Example mobile devices 106 are mobile communication devices such as smart phones and tablet computers. Mobile device 106 typically includes an application, such as a web browser (or simply browser) 114. A user uses browser 114 to request resources over network 102. A user requests a resource by typing the website address associated with the resources that is stored on web server 104. For example, a user, such as publisher 120 may use browser 114 to access studio UI 110 to design an interactive magazine edition using mobile device 106.

Mobile device 106 also includes edition player 116. Edition player 116 displays magazine editions 112 to users. Magazine edition 112 displays dynamic media content on mobile devices 106, where mobile devices have different specifications and display screen size. Edition content included in magazine editions 112 includes content downloaded to magazine editions 112 using content sources 118. To display magazine editions 112, edition player 116 may use a current module 115 or display edition content using edition player 116.

Current module 115 stores magazine editions 112 which are published by publisher 120. Current module 115 may be downloaded to mobile device 106 from, for example, producer server 108 using network 102 or using another interface. Typically, once current module 115 is downloaded to mobile device 106, a user uses current module 115 to subscribe to magazine editions 112. Once subscribed, current module 115 uses mobile device 106 to download magazine editions 112 from producer server 108, or edition distributor 124. Current module 115 also updates magazine edition 112 with new edition content. In an embodiment, current module 115 also provides a user with a listing of recommended magazine editions 112 that may be of interest to the user and that a user may subscribe to.

Producer server 108 includes studio backend 126. Studio backend 126 allows for a design, development and implementation of magazine editions 112. Studio backend 126 communicates with studio UI 110 when publisher 120 uses studio UI 110 to design magazine edition 112.

Once publisher 120 completes designing magazine edition 112 using studio UI 110, magazine edition 112 is uploaded to producer server 108 for storage and distribution. In an embodiment, magazine editions 112 may be stored on producer server 108 in a memory storage described in detail in FIG. 8. In another embodiment, publisher 120 may upload magazine edition 112 to edition distributors 124. A user may access edition distributor 124 and download magazine edition 112 to mobile device 106. In an embodiment, once publisher 120 decides to distribute an upgraded magazine edition 112, mobile devices 106 that include a previous version of magazine edition 112 are synchronized with the upgraded magazine edition 112.

Content sources 118 provide edition content 132 to magazine edition 112. Example content sources 118 include data feeds, RSS feeds, social streams, multi-media sources via media RSS, etc. Content source 118 is typically associated with a publisher 120. Publisher 120 owns a particular content source 118 and controls edition content 132 that is distributed via content sources 118 over network 102.

Producer server 108 receives edition content 132 from content sources 118. Once received, producer server 108 stores edition content 132 in data storage 128. Data storage 128 may be a memory storage described in detail in FIG. 8. In an embodiment, data storage 128 may include a database for storing edition content 132. When magazine edition 112 executing on edition player 116 requests edition content 132, producer server 108 retrieves edition content 132 from data storage 128 and transmits edition content 132 to edition player 116.

Third party services 122 provide services to magazine editions 112. For example, third party services 122 provide streaming video that may be accessed by a uniform resource locator ("URL") link included in magazine edition 112. In another example, third party services 122 determine that a user read a particular article included in magazine edition 112. In another example, third party services 122 provide advertisements for display within magazine edition 112. In another example, third party services 122 provide check out services for merchandize items that are provided for purchase within magazine edition 112.

Edition distributors 124 distribute applications, such as magazine editions 112 to mobile devices 106. For example, when publisher 120 designs magazine edition 112, publisher 120 may elect a particular edition distributor 124 to distribute magazine edition 112. When publisher 120 elects to distribute magazine edition 112 using a particular edition distributor 124, magazine edition 112 is uploaded to edition distributor 124. A user may then use mobile device 106 to access edition distributor 124 and upload magazine edition 112 onto mobile device 106 for an agreed upon fee.

Figure 1B:
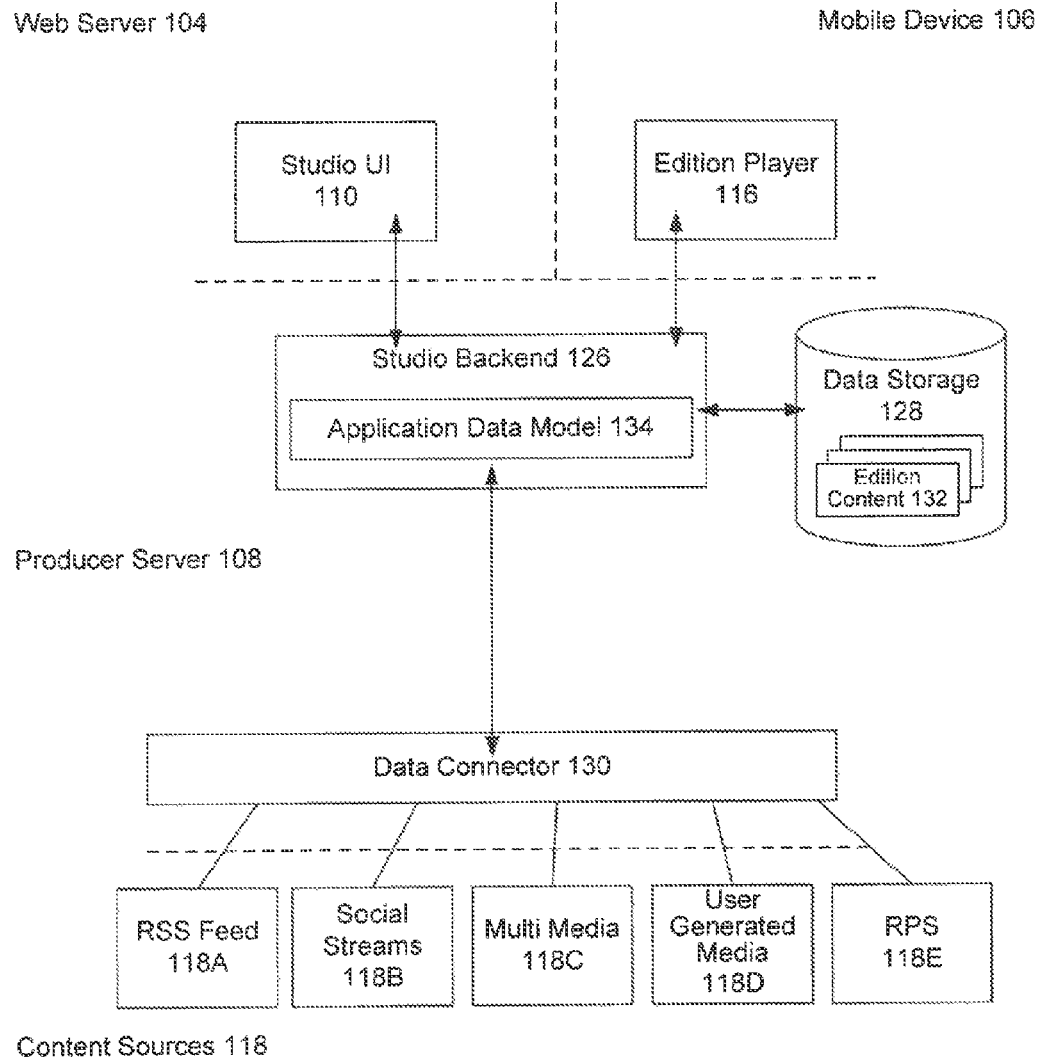
FIG. 1B is a block diagram of components in distributed system 100 that generate and distribute magazine editions, according to an embodiment.

FIG. 1B is a block diagram 100B of components in distributed system 100 that generate and distribute magazine editions.

As described herein content sources 118 provide edition content 132 that is distributed across the web via network 102. For the edition content 132 to be distributed using magazine editions 112, content sources 118 are connected to a producer server 108. In an embodiment, data connector 130 connects multiple content sources 118 and retrieves edition content 132.

Data connector 130 receives data from content sources 118. Data connector 130 may receive edition content 132 from content sources 118 in real-time or at configurable intervals that may be set by a system administrator. Once data connector 130 receives edition content 132 from content sources 118, data connector 130 transmits edition content 132 to data storage 128.

As described herein, data storage 128 distributes data from content sources 118 to magazine editions 112. For example, mobile device 106 may request data for particular magazine editions 112 at configurable time intervals that may be configured by the user subscribing to magazine editions 112.

Studio backend 126 receives the designed magazine editions 112 from studio UI 110. As described herein, studio UI 110 allows publishers 120 to design dynamic and interactive magazine editions that display edition content 132 provided by their content sources 118. Once publisher 120 completes designing magazine edition 112, publisher 120 uploads magazine edition 112 to studio backend 126. Studio backend 126 then stores the uploaded magazine editions 112 on producer server 108 and/or distributes magazine editions 112 to mobile devices 106 or edition distributors 124.

Studio backend 126 includes application data model 134. Application data model 134 includes a format that displays edition content 132 within magazine editions 112. When publisher 120 uses studio UI 110 to create a particular magazine edition 112, studio UI 110 presents publisher 120 with application data model 134 framework that publisher 120 may configure to include edition content 120 for presentation to a user.

Upon request for a user using mobile device 106, studio backend 126 may distribute magazine editions 112 to mobile devices 106. Each magazine edition 112 includes application data model 134 that is configured by publisher 120.

When magazine edition 112 is uploaded to mobile device 106, magazine edition 112 is populated with edition content 132. For example, producer server 108 provides edition content 132 from data storage 128 to magazine edition 112. As edition content 132 is updated with new edition content 132 from content sources 118, producer server 108 synchronizes edition content 132 included in magazine edition 112 with the new edition content 132 that is included in data storage 128.

In an embodiment, the synchronization may occur at configurable time intervals that may be configured by a user using mobile device 106. For example, a user may configure magazine edition 112 to query data storage 128 for new content every hour, every twelve hours, once a day, when requested by a user, etc. In a further embodiment, magazine edition 112 receives edition content 132 from data storage 128 that has been updated since the previous synchronization period, as to minimize the transmission of data over network 102.

Figure 1C:
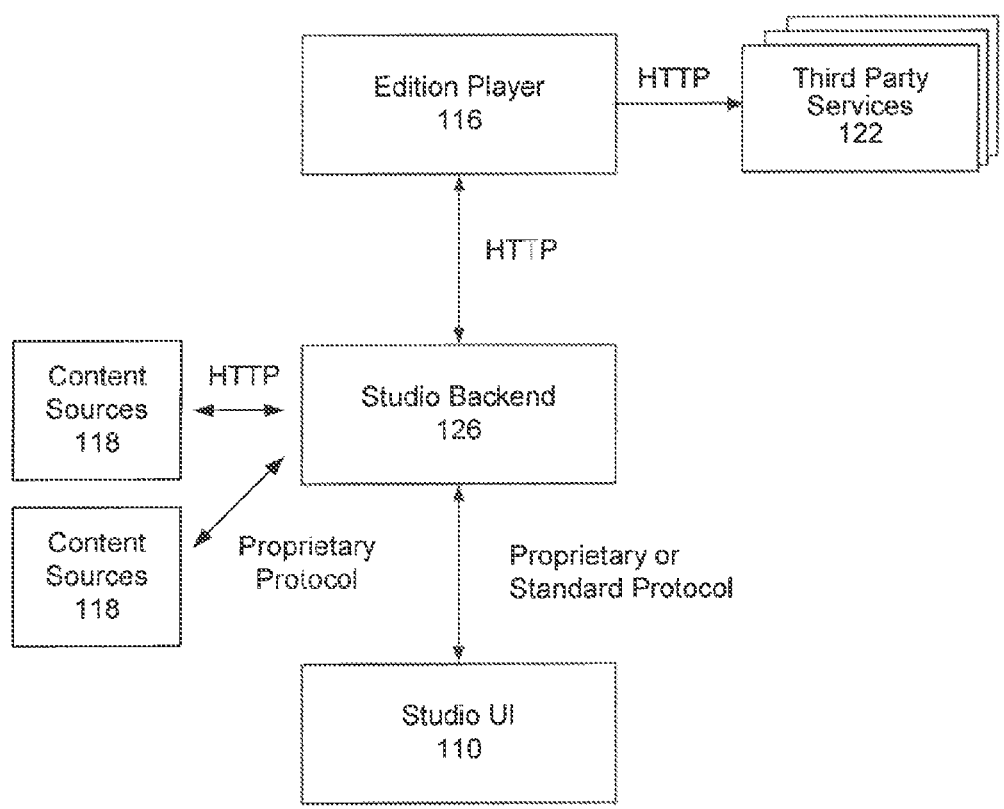
FIG. 1C is a block diagram that describes an exemplary communication interface between the components within the distributed system, according to an embodiment.

FIG. 1C is a block diagram 100C that describes an exemplary communication interface between the components within the distributed system.

For example, edition player 116 may communicate with studio backend 126 using HTTP over network 102. Edition player 116 may also communicate to third party services 122 and edition distributors 124 using HTTP.

Studio UI 110 may communicate with studio backend 126 using a Google Web Toolkit ("GWT") infrastructure, A person skilled in the art will appreciate that GWT allows web application developers to design JavaScript front-end applications using Java source code. In an embodiment GWT uses protocol buffers, also known to a person of ordinary skilled in that art, to pass data that includes magazine editions 112, templates, edition content 132, etc., between studio UI 110 and studio backend 126.

Studio backend 126 also communicates with a variety of content sources 118. In one embodiment, studio backend 126 may be configured to communicate with content sources 118 using a proprietary communication protocol that is specified by a particular content source 118. In another embodiment, studio backend 126 may also communicate with content sources 118 using HTTP.

Figure 2A:
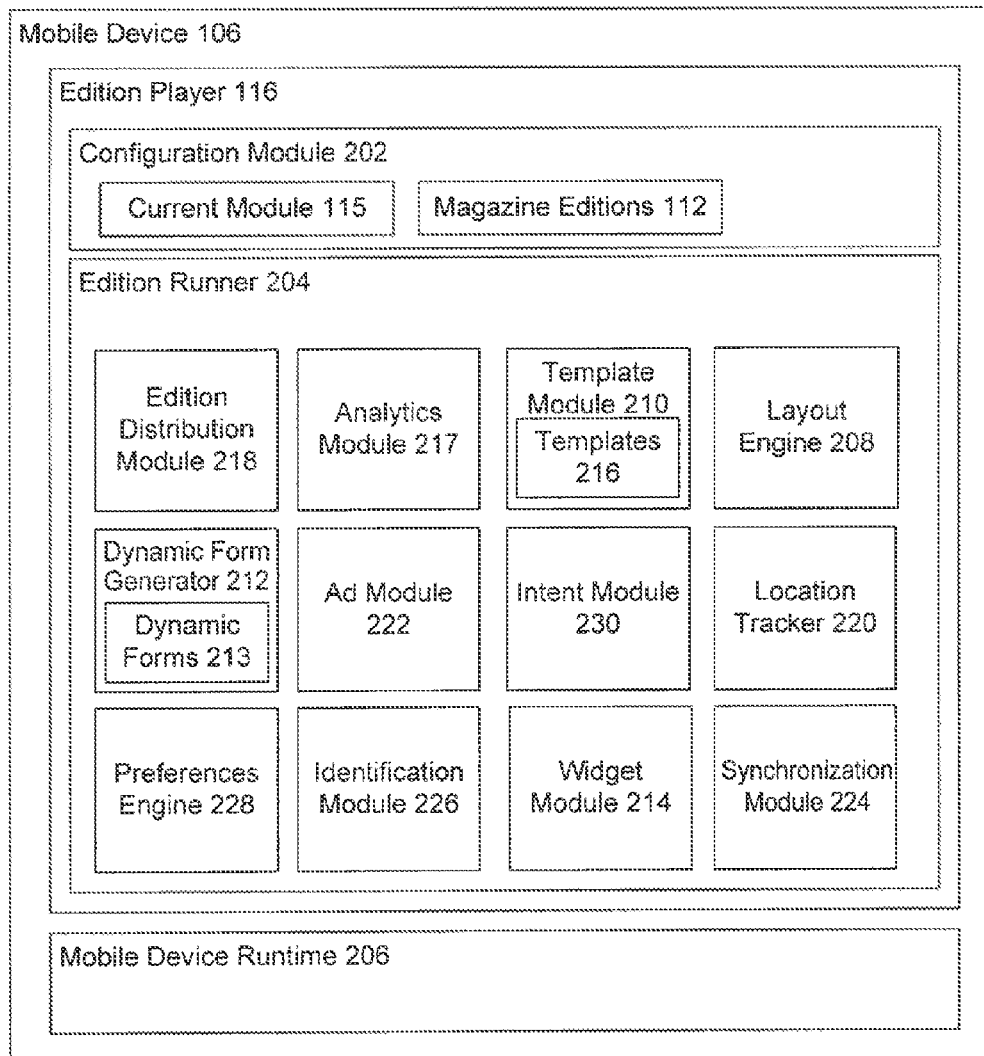
FIG. 2A is a block diagram of an edition player, according to an embodiment.

FIG. 2A is a block diagram 200 of an edition player. As described herein, edition player 116 displays magazine editions 112 to a user.

Edition player 116 includes a configuration module 202. Configuration module 202 determines a configuration mode that displays magazine edition 112 on edition player 116. For example, configuration module 202 may be configured to display magazine editions 112 using current module 115, in one embodiment. In another embodiment, configuration module 202 may be configured to display a single instance of magazine editions 112.

Edition runner 204 executes a configuration included in configuration module 202 and displays magazine editions 112. Example configuration may be executing a single instance of magazine edition 112 or executing current module 115 that provides a user with a selection of multiple magazine editions 112.

Edition runner 204 includes a layout engine 208. Layout engine 208 formats media content for display on mobile devices 106 having different specifications. Layout engine 208 receives edition content 132, using, for example, an HTML stream and generates a multi-column layout of edition content 132 that is appropriate for the display screen size and orientation of mobile device 106. Layout engine 208 interacts with template module 210, dynamic form generator 212 and widget module 214.

Template module 210 includes templates 216. Templates 216 control the rendering of the media content in magazine edition 112. Templates 216 may be native templates that are optimized for executing on edition runner 202, as they use the core mobile device runtime 206 libraries. Templates 216 may also be publisher 120 designed templates that display media content in a format designed by publisher 120. When magazine edition 112 is uploaded to mobile device 106, it stores templates 216 in template module 210.

Analytics module 217 tracks magazine editions 112, sections and articles within each magazine edition 112 viewed or read by a user. Analytics module 217 may compile a listing of the read content. The listing may be sent to publisher's 120 analytic account for determining edition content 132 that is interesting to users. The listing may also be sent to the user's account so that edition player 112 may provide a user with a history of edition content 132 that a user has read and/or accessed. Analytics module 217 may also track sections and articles within magazine editions 112 when a user browses magazine editions 112 of (for example, without access to network 102). Once mobile device 106 is able to access network 102, analytics module 217 uploads the listing to publisher's 120 analytic account and/or user's account.

Edition distribution module 218 communicates with other applications, and distributes magazine editions 112 to third parties. Example third parties may include popular social networking sites, micro blogging services, email accounts associated with users, etc., to name a few. Edition distribution module 218 may be accessed within magazine edition 112 when a user is reading a particular article or section and causes edition player 116 to distribute the read content.

Location tracker 220 identifies a location, such as latitude and longitude location of mobile device 106. Once the location of mobile devices 106 is identified, edition content 132 included in magazine edition 112 may be tailored to a location of mobile device 106.

Advertisement module 222 inserts advertisements into edition content 132 displayed by magazine edition 112. Advertisement module 222 determines where and when to include advertisements within magazine edition 112. For example, when layout engine 208 renders edition content 132 on a mobile device 106 in a way that includes an unfilled space, advertisement module 222 detects the unfilled space and queries an advertisement system to select an advertisement for inclusion in the unfilled space in real-time. Advertisement module 222 also communicates with various advertising entities that provide advertisement module 222 with advertisements for display within magazine edition 112.

Dynamic form generator 212 generates dynamic forms 213. Dynamic forms 213 render an arbitrary section within magazine edition 112 based on metadata provided by individual users. For example, dynamic forms 213 may be used to display submissions by individual users who, for example, practice citizen journalism.

Synchronization module 224 communicates with a studio backend 126 and retrieves edition content 132 from data storage 128. Synchronization module 224 also identifies the subscriptions that a user subscribed to using particular magazine editions 112 and synchronizes the edition content 132 included in the subscriptions with edition content 132 provided by content sources 118.

Widget module 214 enhances edition content 132 displayed in magazine edition 112. For example, when a slide show is included in edition content 132, widget module 214 renders the slide show. In another example, when edition content 132 includes geo-coordinates, widget module 214 launches an application that displays a map. In another example, when edition content 132 includes a video application, widget module 214 launches a video display application, etc. A person skilled in the art will appreciate that the embodiments above are given by way of example and not limitation and that other means for enhancing edition content 132 may be used.

Identification module 226 identifies a user that uses mobile device 106 and subscribes to particular magazine editions 112.

Preferences engine 228 determines the configuration of a user. For example, a user may configure time intervals for when magazine edition content is synchronized with studio backend 126.

Intent module 230 launches an application within edition runner 204 that a user wants to use to view edition content 132 in magazine edition 112. For example, when a user clicks on a post that includes a video, intent module 230 launches a video application. In another example, when a user wants to send an email, intent module 230 launches an email application.

Mobile device runtime 206 executes edition runner 204. Mobile device runtime 206 is a runtime that is native to mobile device 106. Mobile device runtime 206 allows a user to use edition player 116 to view magazine editions 112 on mobile device 106. Typically, mobile device 106 includes different mobile device runtimes 206 that execute mobile device 106 specific operating platforms.

2. A SYSTEM FOR DISPLAYING MAGAZINE EDITIONS AND EDITION CONTENT IN CURRENTS

Figure 2B:
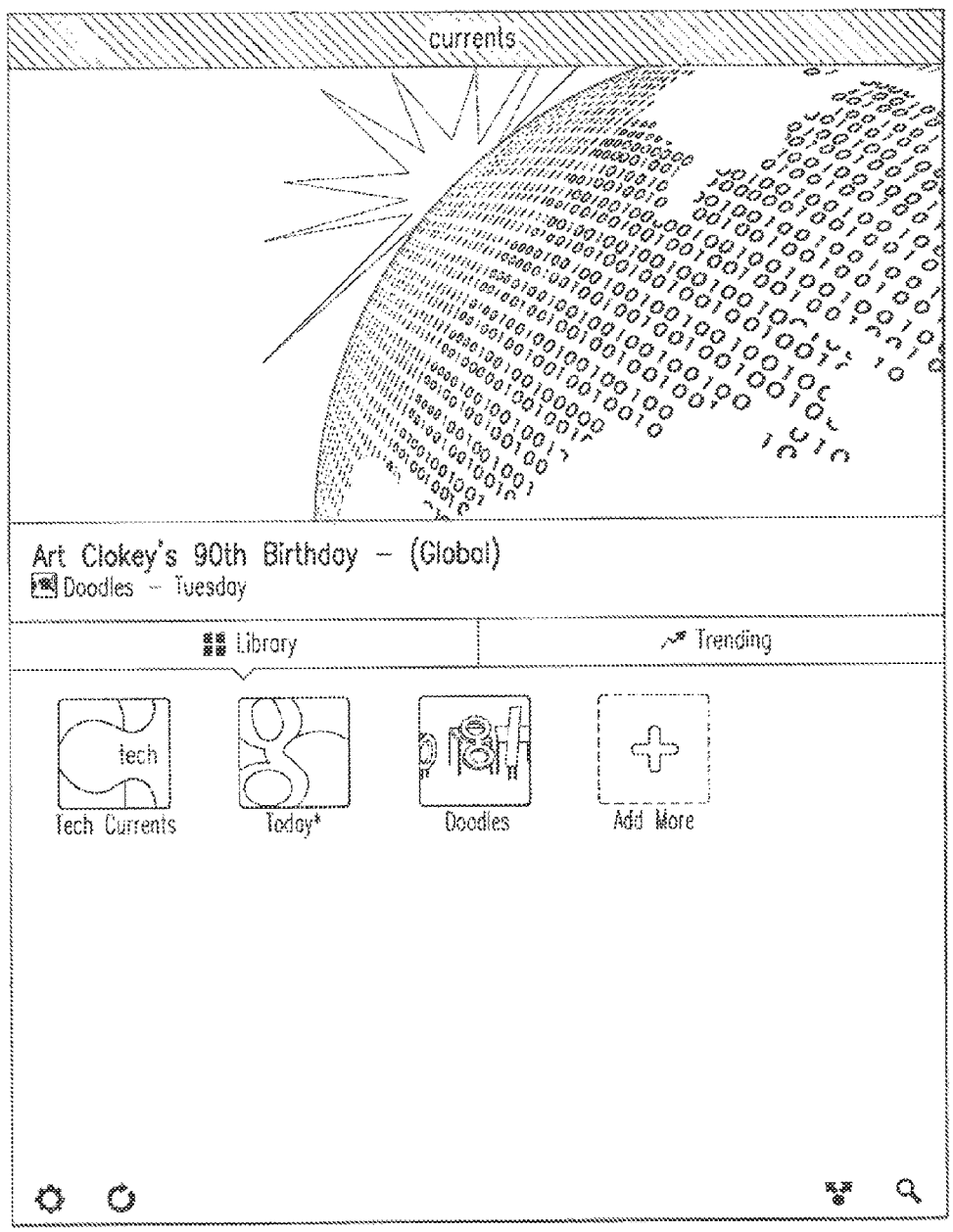
FIG. 2B is a screen shot of a current module displaying multiple magazine editions, according to an embodiment.
Figure 2C:
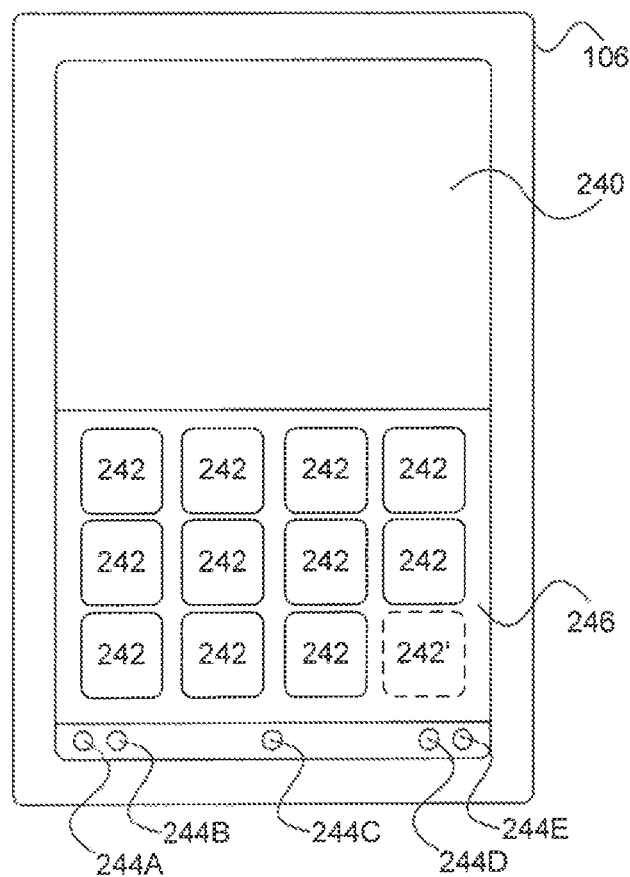
FIG. 2C is a block diagram of a display screen displaying multiple magazine editions, according to an embodiment.

FIG. 2B is a screen shot 200B of a current module displaying multiple magazine editions, according to an embodiment. FIG. 2C is a block diagram 200C of a display screen displaying multiple magazine editions, according to an embodiment.

When current module 115 displays magazine editions 112, current module 115 generates an edition preview pane 240 and edition thumbnails 242 on a display screen of mobile device 106. Each edition thumbnail 242 represents an access point to magazine editions 112 that a user subscribes to using mobile device 106. Edition preview pane 240 includes images from the subscribed magazine editions 112.

Edition thumbnails 242 receive an indication from a user to launch the associated magazine edition 112. For example, a user may use a touch screen display on mobile device 106 to issue an indication to access magazine edition using thumbnail 242. Once an indication is received, current module 115 initializes magazine edition 112. In an embodiment, edition preview pane 240 may also receive an indication from a user to launch magazine edition 112. When magazine edition 112 is launched using edition preview pane 240, current module 112 may retrieve a post within magazine edition 112 that is associated with the image in the edition preview pane 240 and display the post to the user. An example post may be a news article, a video clip, a blog, etc.

In an embodiment, the dimensions and orientation of a display screen on mobile device 106 control the display size and content of edition preview pane 240 and edition thumbnails 242. In a further embodiment, current module 115 configures the display of edition thumbnails 242 such that a user may view edition thumbnails 242 by scrolling along, for example, x-axis or y-axis. When a user scrolls through thumbnails 242, for example, along x-axis, the images in edition preview pane 240 remain in place and are independent of the scrolling. Similarly, when a user uses vertical scrolling, the scrolling is independent of edition preview pane 240, as edition thumbnails 242 disappear from view below edition preview pane 240.

In an embodiment, edition thumbnail 242 may display an image, as shown in FIG. 2B. The image of magazine edition 112 that is displayed in edition thumbnail 242 may be selected by publisher 120 using studio UI 110.

Similarly, the selection of images from magazine editions 112 displayed in edition preview pane 240 may be scrolled through along x-axis or y-axis. Scrolling through images in edition preview pane 240 is independent of thumbnail section 246 that hosts edition thumbnails 242.

As previously mentioned, current module 115 uses the dimensions of a display screen on mobile device 106 to format images for display in edition preview pane 240 and edition thumbnails 242 in thumbnail section 246. Current module 115 requests the dimensions of a display screen from the operating platform that executes on mobile device 106. In one embodiment, the operating platform returns the dimensions as the number of pixels that are included in vertical and horizontal dimensions of the display screen on mobile device 106.

Once current module 115 receives the requested dimensions, current module 115 determines whether the vertical dimension exceeds a predefined threshold. When the vertical dimension exceeds the predefined threshold, current module 115 may allocate, in a non-limiting example, approximately a half or a third of the display screen for edition preview pane 242, and the remaining portions of the display screen for thumbnail section 246. When the vertical dimension is less than the predefined threshold, current module 115 determines the dimensions of thumbnail section 246 that may display a preconfigured number of rows that include edition thumbnails 242. Current module 115 then user the remaining space on the display screen to display edition preview pane 240. In an embodiment, current module 115 may determine that the dimensions of the display screen do not allow for display of edition preview pane 240, and may elect to remove edition preview pane 240 from the display screen.

As described herein, images that are displayed within edition preview pane 240 are included in magazine editions 112 that are subscribed to by a user. Edition preview pane 240 may be used to entice a user to select and view magazine edition 112 that includes the image. In an embodiment, current module 115 may select an image from each magazine edition 112, and display each image as a slide show on edition preview pane 240. Each image in the slide show may be displayed for a preconfigured amount of time on edition preview pane 240. In an embodiment, the slide show may be displayed in the order of the displayed edition thumbnails 242 in thumbnail section 246. In an embodiment, current module 115 selects a largest image from each magazine edition 112, In another embodiment, current module 115 selects a newest image from each magazine edition 112. In another embodiment, current module 115 may select images for display within edition preview pane 240 based on user preferences or content that may be of interest to the user.

When a user selects the image displayed in edition preview pane 240, current module 115 routes the user to a post within a section that includes the selected image, Once a user selects a post within magazine edition 112 that includes the image, current module 115 marks the selection in its memory, using, for example, an image bit associated with the image. Image bit identifies whether a user selected a post within magazine edition 112 through the image displayed in edition preview pane 240.

In an embodiment, current module 115 uses an image bit to remove the images from the slide show that were previously selected by a user. When an image in the slide show associated with magazine edition 112 was selected by a user, current module 115 identifies another image in magazine edition 112 for inclusion in edition preview pane 240.

When a user accesses magazine edition 112 using edition thumbnail 242, a user is presented with sections that are included in magazine edition 112. Each section displays edition content of a particular type, such as, in a non-limiting example, news, videos, info-graphics, merchandise items for sale, etc. When a user selects a particular section, the posts included in the section are loaded and displayed to the user. Layout engine 208 generates a layout for edition content 132 that is included in each section. Layout engine 208 may generate a layout that is a combination of posts, images included in the posts, and advertisements that may be inserted into the posts.

In an embodiment, edition runner 204 loads the current page that is displayed on mobile device 106 to a user, as well as previous and next pages. Thus, when a user scrolls through the pages, the user is able to view the end of the current page that was displayed to the user and the beginning of the next page. Similarly, when a user scrolls back to a previous page, the user is able to view a portion of the previous page and the current page on a display screen of a mobile device.

Layout engine 208 lays out edition thumbnails 242 within thumbnails section 246. Layout engine 208 also initializes widget module 214. Widget module 214 generates an edition page widget list that determines a number of pages to display edition thumbnails 242. As described herein, the number of pages may be a function of the dimensions of a display screen on mobile device 106.

The edition page widget list also pre-renders the page that is displayed on the display screen, a previous page that includes edition thumbnails 242 (if any) and a next page that displays edition thumbnails 242 in thumbnail section 246 when edition thumbnails 242 are displayed using multiple pages. The order in which edition thumbnails 242 are displayed in thumbnail section 246 may depend on the popularity of the corresponding magazine edition 112 (such as the number of subscriptions to magazine edition 112), in alphabetical order by title of magazine edition, or be configured based on user preferences.

Additionally, edition page widget list includes a function that retrieves a particular page within magazine edition 112. For example, the function may return the page that includes edition preview pane 240 or a "Goto" menu, described below.

When a particular thumbnail edition 242 is selected, widget module 116 activates a section widget. The section widget causes a layout engine 208 to generate a layout of sections 306 within magazine edition 112 as configured by publisher 120. Similarly to a thumbnail edition layout, a section widget may load three pages for display within magazine edition 112, and continue to upload more pages as the user scrolls through the sections.

When a user selects a particular post within magazine edition 112, widget module 116 activates a post widget. The post widget retrieves a particular post. Once post widget retrieves a particular post, post widget activates a layout engine 208 to layout out a current page in magazine edition 112 that includes edition content 132 included in a post, a previous page that may include edition content 132 from another post and a next page in magazine edition 112.

In an embodiment, current module 115 also includes magazine edition controls 244A-E. Edition controls 244A-E may be configured by a user. In one embodiment, edition control 244A allows users to navigate backwards through magazine edition 112, such as to a previous page, a previous post or a previous section. In another embodiment, edition control 244A may be overloaded to perform a number of functions. For example, edition control 244A may be overloaded to go back to a previous page, then to a previous post, then to the table of contents within magazine edition, and then to a display screen displayed in screen 200B.

In an embodiment, edition control 244E may be set to go to the next page in a post, or skip to the next post in the section.

Figure 3A:
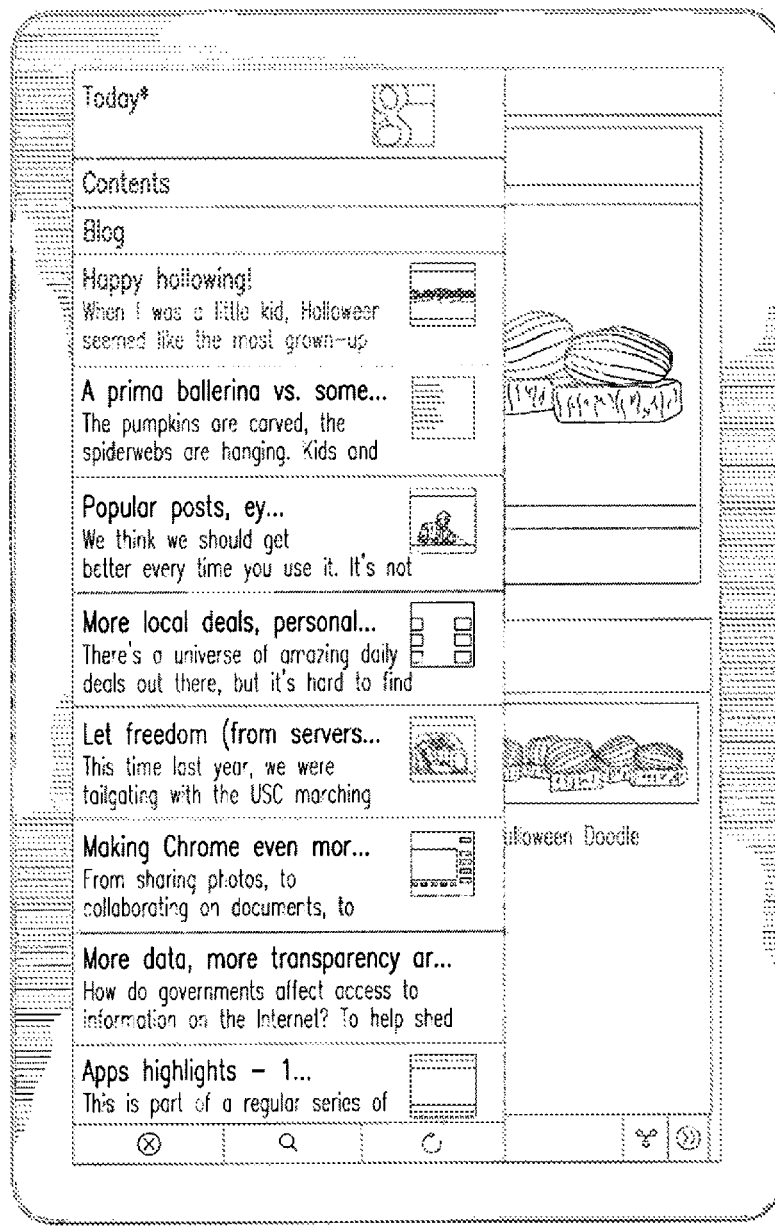
FIG. 3A is a screen shot of a current module displaying a "Goto" menu within a magazine editions, according to an embodiment.
Figure 3B:
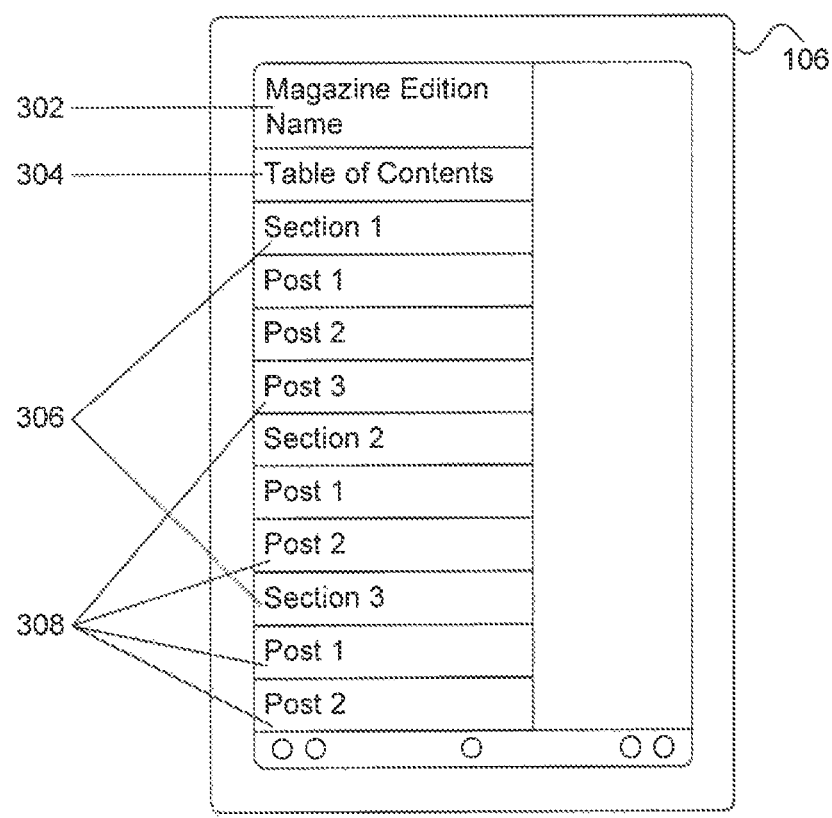
FIG. 3B is a block diagram of a current module displaying a "Goto" menu within a magazine edition, according to an embodiment.

In another embodiment, edition control 244B in may include a "Goto" menu of magazine edition 112. FIG. 3A is a screen shot 300A of a current module displaying a "Goto" menu within a magazine edition 112, according to an embodiment. FIG. 3A is a block diagram 300B of a current module displaying a "Goto" menu within a magazine edition, according to an embodiment.

When a user selects edition control 244B widget module 116 activates a widget that displays a "Goto" menu. The "Goto" menu includes a list view of edition content 132 included in magazine edition 112. "Goto" menu includes a magazine edition name 302 and a table of contents 304. Within table of contents 304, the "Goto" menu includes a listing of sections 306 and posts 308 that are included in each section 306.

The number of sections 306 and posts 308 within the "Goto" menu may be configured based on the number of sections and posts included in magazine edition 112 and the dimensions of the display screen of mobile device 106. The purpose of the configuration is to dynamically fill the "Goto" menu with posts and sections included in magazine edition 112 to entice the user the access the displayed content.

In one embodiment, when a number of sections 306 is equal to or greater than a predefined threshold, layout engine 204 allocates a predetermined number of posts 308 per section in the "Goto" menu. When a number of sections 306 is less than a predefined threshold, then the number of posts 308 included in the "Goto" menu may be a function of the number of sections 306 and number of posts 308 within each section. As described herein, the function is designed to fill the space allocated for the "Goto" menu in the display screen.

3. A SYSTEM FOR SELECTING MAGAZINE EDITIONS FOR DISPLAY ON A MOBILE DEVICE

Going back to FIGS. 2B and 2C, current module 115 may also display an edition thumbnail 242' for adding magazine editions 112 to edition player 116. In FIG. 2B, the edition thumbnail 242' for adding magazine editions 112 may be designated as "Add More" thumbnail. When edition thumbnail 242' is activated, users may search magazine editions 112 that are available for distribution on producer server 108. For example, edition control 242' initializes a display where a user is allowed to enter a name or a portion of a name that corresponds to magazine edition 112. Once a user completes entering a name for magazine edition 112, current module 115 causes mobile device 106 to query producer server 108 for a listing of magazine editions 112 that include the entered name. In another embodiment, a user may be provided with a listing of magazine editions 112 from which a user may select the desired magazine editions 112.

Producer server 108 then provides the listing of magazine editions 112 to mobile device 106. In the listing, a user is able to view a popularity of each magazine edition 112 with the other users. For example, a listing may display the number of users that subscribe to each magazine edition 112.

In an embodiment, edition player 116 may display magazine editions 112 by categories. In an embodiment, when publisher 120 uses studio UI 110 to design magazine edition 112, publisher 120 may select a preferred category for the designed magazine edition 112. Producer server 108 then uses the category selected by publisher 120 to display magazine edition 112 in the appropriate category in edition player 116.

In an embodiment, producer server 108 may control the number of magazine editions 112 that are included in each category displayed on mobile device 106. For example producer server 108 may select to include only premier magazine editions 112 for display on mobile device 106, where the premier magazine editions 112 include a number of subscriptions above a predefined threshold.

When a user selects magazine editions 112 for inclusion within current module 115 on mobile device 106, edition runner 204 optimizes the upload of the selected magazine editions 112. In an embodiment, when a user selects multiple magazine editions 112, edition runner 204 stores the name or another identifier associated with magazine edition 112 in the memory of mobile device 106. A person skilled in the art will appreciate that a memory may include a local database configured to execute on mobile device 106. Each time a user selects magazine edition 112 for an upload, edition runner 204 may add a row that includes a selected magazine edition 112 into a table in the local database that includes magazine edition 112 identifiers and criteria. Once a user completes selecting magazine editions 112 for the upload, edition runner 204 queries the local database and selects magazine editions 112 that a user selected for the upload. Edition runner 204 then generates a message to producer server 108 that includes magazine edition 112 identifiers that are associated with magazine editions 112 selected by a user.

In response, producer server 108 downloads the selected magazine editions 112 to mobile devices 106. Or magazine editions 112 are received from producer server 108, a local database may be updated with the credentials associated with the received magazine edition 112.

4. METHOD FOR DISPLAYING MAGAZINE EDITIONS AND EDITION CONTENT IN CURRENTS

Figure 4:
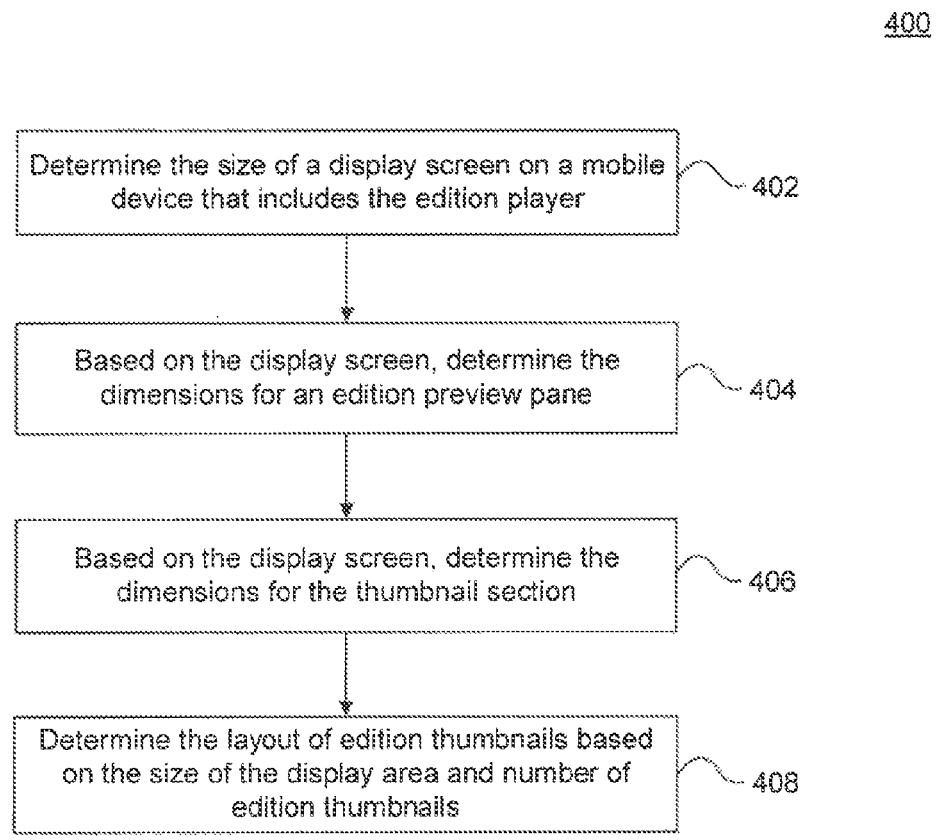
FIG. 4 is a flowchart of a method for displaying multiple magazine editions, according to an embodiment.

FIG. 4 is a flowchart 400 of a method for displaying multiple magazine editions, according to an embodiment.

At stage 402, the dimensions of the display screen are determined. For example, edition runner 204 determines the size of the display screen on mobile device that displays magazine editions 112. In an embodiment, edition runner 204 may query an operating platform on mobile device 106 for the dimensions. Along with dimensions, edition runner 204 may also receive as vertical or horizontal orientation of mobile device 106, for mobile device 106 that displays media content in either orientation.

At stage 404, dimensions of an edition preview pane section are determined. As described herein, edition runner 204 receives the requested dimensions, current module 115 determines whether the vertical dimension exceeds a predefined threshold and allocates space for edition preview pane 240 based on the determination.

At stage 406, dimensions of a thumbnail section are determined. As described herein, when current module 115 receives the requested dimensions, and the dimensions are below the predefined threshold, current module 115 generates enough space for thumbnail section 246 to include a configurable number of rows that include edition thumbnails 242. Otherwise, current module 115 generates as many rows in the thumbnail section 246 as the thumbnail section 246 permits.

At stage 408, the layout of the magazine editions is determined. For example, current module 115 determines the order of editions thumbnails 242 that are included in edition player 116. The order of edition thumbnails may be based on the popularity of magazine editions 112, such as, the number of subscriptions, alphabetical order based on title, or preferences by the user. When the number of edition thumbnails 242 exceeds the available space in thumbnail section 246, edition thumbnails 242 are laid out in multiple pages, with the number of edition thumbnails 242 based on the dimensions of thumbnail section 246. A user may then list through edition thumbnail 242 pages in a vertical or horizontal manner, as described herein.

Figure 5:
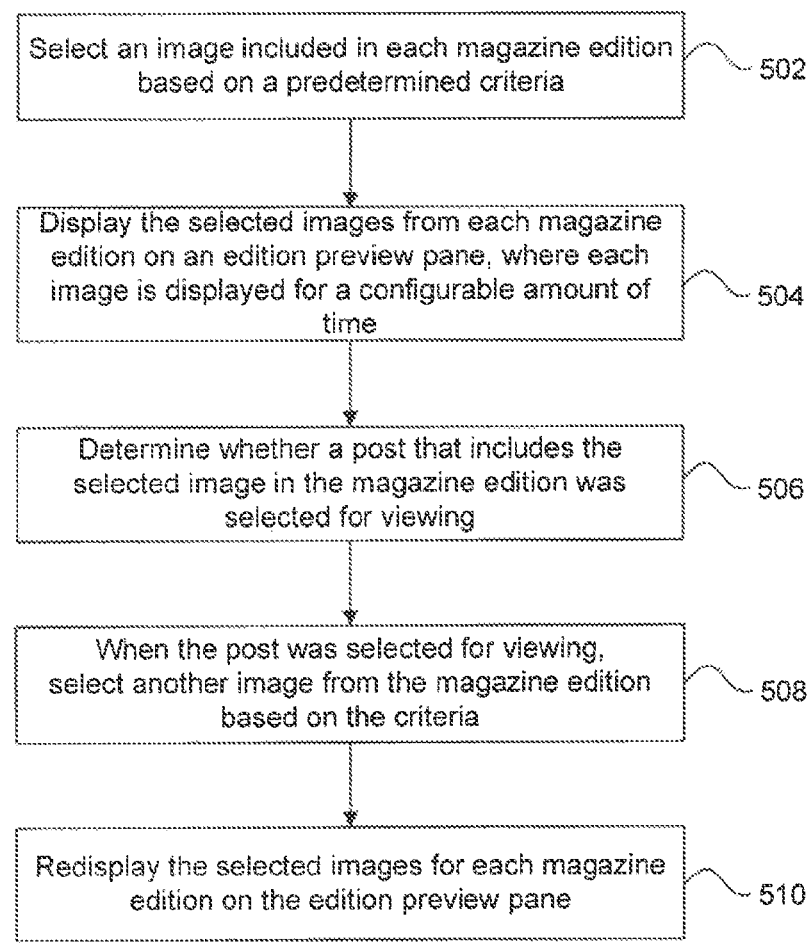
FIG. 5 is a flowchart of a method for selecting an image for an edition preview pane, according to an embodiment.

FIG. 5 is a flowchart of a method 500 for selecting an image for an edition preview pane, according to an embodiment.

At stage 502, an image from each magazine edition is selected. For example, edition runner 204 selects an image from each magazine edition 112 uploaded to mobile device 106. Edition runner 204 selects an image using configurable criteria, such as, for example, the newest image in magazine edition 112 or the largest image.

At stage 504, the selected images are displayed. The selected image is displayed in edition preview pane 240. For example, the selected images are displayed as a slide show, where each image is displayed for a configurable amount of time. A user may also browse through the images using the touch screen display of mobile device 106.

At stage 506, a determination is made as to whether a post that includes an image was selected for viewing. When a user selects a post, such as an article or a video that includes the image in magazine edition 112, the image is deemed accessed, and the flowchart proceeds to stage 508.

At stage 508, when the post was selected for viewing, another image is selected from the magazine edition. For example, edition runner 204 selects an image for viewing, other than the image that is associated with the accessed post in stage 506. Edition runner 204 may use criteria of stage 502 to select the new image.

At stage 510, redisplay the newly selected image in the edition preview pane. For example, edition runner 204 includes the image selected in stage 508 for display in edition preview pane 242, via, the slide show described above.

Figure 6:
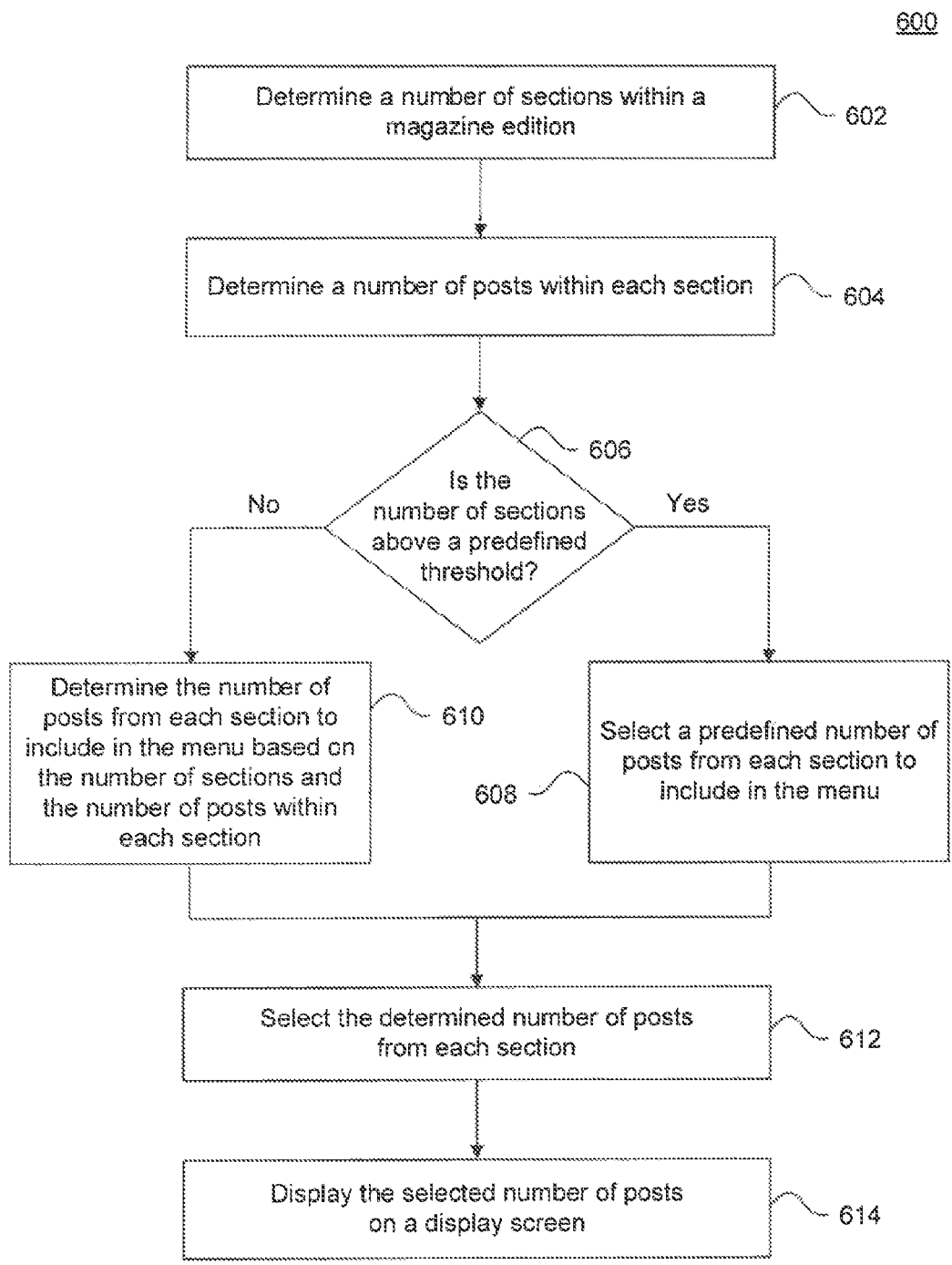
FIG. 6 is a flowchart of a method for generating a "Goto" menu for a magazine edition, according to an embodiment.

FIG. 6 is a flowchart 600 of a method for generating a "Goto" menu for a magazine edition, according to an embodiment. The "Goto" menu for each magazine edition changes as edition content 132 is updated or synchronized with data storage 128.

At stage 602, a number of sections is determined. For example, edition runner 204 determines a number of sections 306 within magazine edition 112. As described herein, the number of sections 306 are predefined by publisher 120 when publisher 120 designs magazine edition 112 using studio UI.

At stage 604, the number of posts within each section is determined. For example, edition runner 204 determines a number of posts 308 within each section 306. Typically, the number of posts 206 depends on edition content 132 that is provided by content sources 118, and may change when edition content 132 is updated or synchronized with data storage 128.

At stage 606, a determination regarding a number of sections is made. When a number of sections 306 is above a predefined threshold, the flowchart proceeds to stage 608, otherwise to stage 610.

At stage 608, a predefined number of posts from each section is selected. For example, edition runner 204 selects a predefined number of posts 308 from each section 306 for inclusion in the "Goto" menu. In an embodiment, the selected posts 308 may be the most recently updated posts 308 or posts 308 that have not been previously viewed by a user. After stage 608, the flowchart proceeds to stage 612.

At stage 610, a number of posts for inclusion in the "Goto" menu is determined. For example, edition runner 204 determines a number of posts 308 such that sections 306 and posts 308 fill the "Goto" menu on the display screen of mobile device 106. In an embodiment, edition runner 204 selects a number of posts 308 from each section 306 based on a predefined function.

At stage 612 the posts are selected. For example, edition runner 204 selects posts 308 from each section 306 according to a number determined in stages 608 or 610.

At stage 614 the section and posts are displayed. For example, edition runner 204 displays the titles of sections 306 and posts 308 in the "Goto" menu. As described herein, when edition content 132 displayed in magazine edition 112 is updated, or publisher 120 includes or removes sections 306 from magazine edition 112, the "Goto" menu may redisplay the included content.

5. PULL-UP FOR EXTENDED ACTIONS FOR EDITION CONTROLS

As described herein, edition player 116 includes multiple application controls, such as edition controls 244. In an embodiment, edition control 244 may be overloaded with extended action functionality. Extended action functionality allows a single edition control 244 to include multiple actions. For example, each edition control 244 may be associated with a basic functionality, such as post 308 sharing or browsing history. The extended action functionality associated with edition control 244 extends the basic functionality to a functionality that is derived, for example, from a behavior, actions or credentials of a user. For example, edition runner 204 may derive extended actions from the actions of a user, as a user browses magazine editions 112 using edition runner 116.

Extended actions may be used on mobile device 106 that includes a touch-screen display, such as a smart phone, and that has a limited amount of display real estate. Extended actions allow a user to have additional controls to manipulate edition player 116 and magazine editions 112 without cluttering the valuable real estate on mobile device 106 with multiple control buttons and menus.

When edition control 244 is overloaded with an extended action, edition control 244 receives an indication from a user to activate the extended action. An indication may be received on a touch screen display on mobile device 106, when the touch screen display receives a pull up indication from a user. An example indication may be a user touching edition control 244 and pulling edition control 244 up or down along a vertical axis, or sideways along a horizontal axis. As edition control 244 is pulled along a vertical or horizontal axis, extended actions appear to the user.

When edition control 244 is overloaded with extended actions, the extended actions are stored as an extended action list. Extended actions within the extended action list are indexed to a particular index value. When a user selects a particular extended action, edition runner 204 searches an extended action that corresponds to a particular index value. When extended actions are based on the user's usage of edition runner 116, the number of the extended actions and the corresponding index values may change as extended actions are being added or removed from the extended action list.

Each extended action may be selected by a user. In one embodiment, a touch screen display on a mobile device receives an indication when a user positions his fingers over a particular extended action and releases edition control 244.

When edition control 244 does not include an extended action desired by a user, the selection may be cancelled. For example, a user may continue to issue a pull up indication to edition control 244 on the display screen, until all extended actions are displayed. If none of the extended actions are selected, the entire selection may be cancelled and disappear from view.

In an embodiment, extended actions may be determined based on the browsing history of a user, be preconfigured in edition runner 116, be configured by publisher 120 for a particular magazine edition 112 or be configured by a user. In another embodiment, edition control 244 that is displayed on the screen is configured to display the basic behavior of the action, such as, for example, browse backwards or forwards in magazine edition 112, activate magazine edition 112, distribute post 308 in magazine edition 112, etc. In this embodiment, the extended action list provides flexibility and additional functionality to the behavior included in edition control 244.

For example, edition control 244D may be configured to distribute magazine edition 112 or post 308 within magazine edition 112 to other users. An extended action list for edition control 244D may be distributing the selected magazine edition 112 or post 308 to "family", "friends", people that the user has shared with recently, etc.

In another example, edition control 244A may be configured to allow a user to move within magazine edition hierarchy in current module 115. The basic behavior of edition control 244A may be set at going back to a previous post 308, previous section 306 and previous magazine edition 112, as described above. An extended action list may be generated for edition control 244A that provides a user with a selection of the user's browsing history when a user uses edition player 116. For example, as a user may be presented with an extended action list of the recent list of actions that the user performed while browsing magazine edition 112, such as going to a particular section 306 or post 308. Once the user is presented with the list of extended actions, a user may select the extended action from the pull up list, or continue pulling up until the selection is cancelled.

Figure 7:
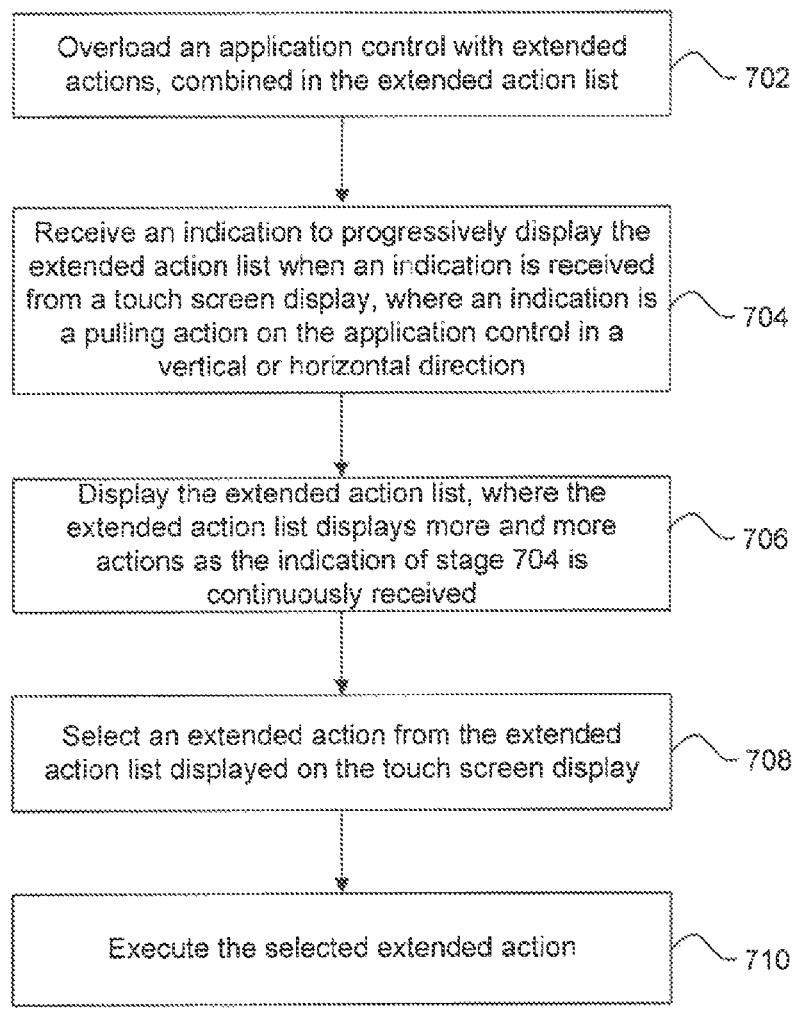
FIG. 7 is a flowchart of a method for receiving an extended action, according to an embodiment.

FIG. 7 is a flowchart 700 of a method for receiving an extended action, according to an embodiment.

At stage 702, an edition control is overloaded with extended actions. For example, some or all edition controls 244 in edition player 116 may be overloaded to receive an extended action indication. Once, edition control 244 is overloaded to include extended action functionality, edition control 244 is associated with a configurable extended action list. In an embodiment, each action in the extended action list may be configured to supplement the behavior of edition control 244. As a user continues to use edition player 116, actions may be added or removed form an extended action list associated with edition control 244.

At stage 704, an extended action list is activated. For example, a touch-screen display on mobile device 106 receives an indication that edition control 244 is being pulled along a vertical or horizontal axis.

At stage 706, an extended action list is displayed. As the indication is received on mobile device 106, extended action list is displayed on the touch-screen display of the mobile device 106. As the indication continues, more and more extended actions within extended action list are displayed on the touch-screen display.

At stage 708, an extended action is selected. For example, when the edition control 244 is released on a particular action, that extended action is selected. The selected extended action includes an index number which corresponds to a module that is invoked to execute the extended action. An extended action selection may also be cancelled when edition control 244 when all extended actions in the extended action list are displayed and mobile device 106 continues to receive an indication to display more extended actions. When the extended action is selected, the extended action list may condense to edition control 244.

At stage 710, the extended action is executed. For example, a module that corresponds to the selected extended action is activated, when the extended action is selected. The activated module executes the extended action. The module may be retrieved through an index that corresponds to a name of an extended action in the extended action list.

6. CONCLUSION

Figure 8:
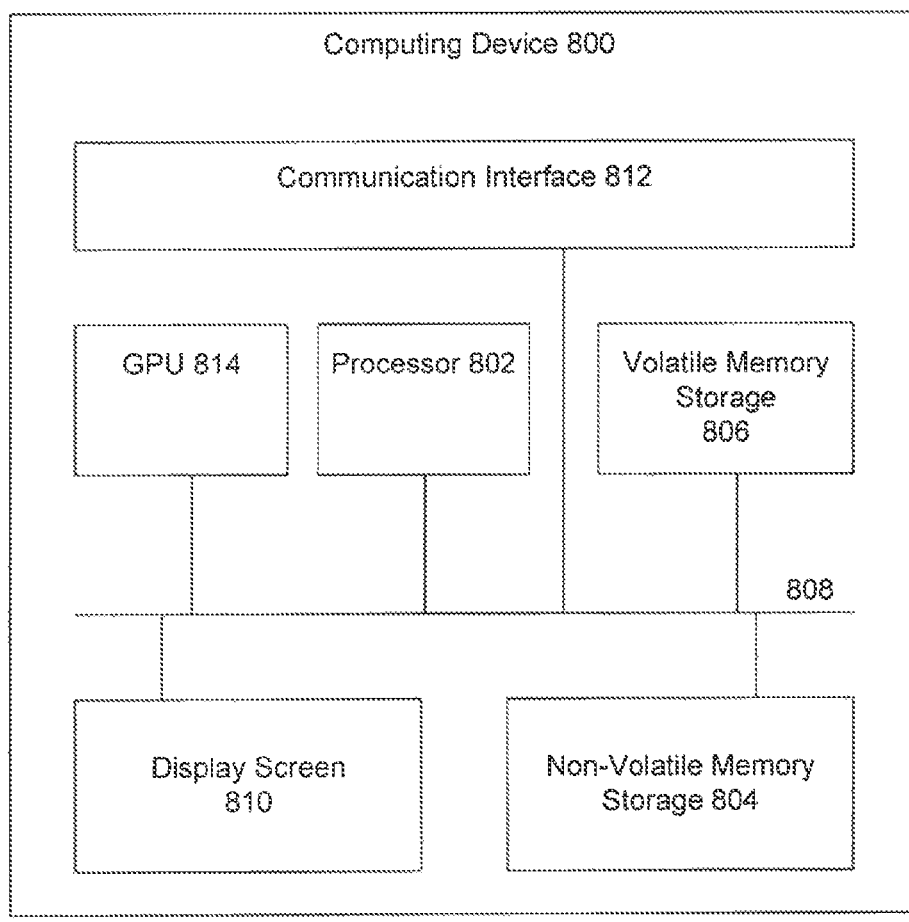
FIG. 8 is an example computer system in which embodiments of the present invention, or portions thereof, may be implemented as computer-readable code.

FIG. 8 is an example computer system 800 in which embodiments of the present invention, or portions thereof, may be implemented as computer-readable code. For example, the components or modules of distributed system 100, such as studio UI 110, magazine editions 112, current module 115, studio backend 126, edition runner 204, etc., may be implemented in one or more computer systems 800 using hardware, software, firmware, tangible computer-readable media having instructions stored thereon, or a combination thereof and may be implemented in one or more computer systems or other processing systems. Modules and components in FIGS. 1-7 may be embodied in hardware, software, or any combination thereof.

Client 106, web server 104 and producer server 108 may include one or more computing devices that include a computer system 800. Computer system 800 may include one or more processors 802, one or more non-volatile storage mediums 804, one or more memory devices 806, a communication infrastructure 808, a display screen 810 and a communication interface 812.

Processors 802 may include any conventional or special purpose processor, including, but not limited to, digital signal processor (DSP), field programmable gate array (FPGA), and application specific integrated circuit (ASIC).

CPU 814 is a specialized processor that executes instructions and programs, selected for complex graphics and mathematical operations, in parallel.

Non-volatile storage 804 may include one or more of a hard disk drive, flash memory, and like devices that may store computer program instructions and data on computer-readable media, One or more of non-volatile storage device 804 may be a removable storage device.

Memory devices 806 may include one or more volatile memory devices such as but not limited to, random access memory. Communication infrastructure 808 may include one or more device interconnection buses such as Ethernet, Peripheral Component interconnect (PCI), and the like.

Typically, computer instructions are executed using one or more processors 802 and can be stored in non-volatile storage medium 804 or memory devices 806.

Display screen 810 allows results of the computer operations to be displayed to a user or an application developer.

Communication interface 812 allows software and data to be transferred between computer system 800 and external devices. Communication interface 812 may include a modem, a network interface (such as an Ethernet card), a communications port, a PCMCIA slot and card, or the like. Software and data transferred via communication interface 812 may be in the form of signals, which may be electronic, electromagnetic, optical, or other signals capable of being received by communication interface 812. These signals may be provided to communication interface 812 via a communications path. The communications path carries signals and may be implemented using wire or cable, fiber optics, a phone line, a cellular phone link, an RE link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for generating a magazine edition menu to display information of a plurality of magazine editions on a single display screen of a mobile device, comprising:

querying an operating system on a mobile device to determine dimensions of the single display screen;

based on the dimensions, determining the size of an edition preview pane, the edition preview pane displaying a plurality of images from each magazine edition of the plurality of the magazine editions;

based on the dimensions and the size of the edition preview pane, determining the size of a thumbnail section, the thumbnail section displaying a plurality of thumbnail editions, each thumbnail edition associated with each magazine edition of the plurality of the magazine editions, wherein the thumbnail editions display images representing corresponding associated magazine editions of the plurality of the magazine editions and the thumbnail editions are selectable by a user to launch a corresponding associated magazine edition;

based on the size of the thumbnail section and a number of the plurality of magazine editions, determining a layout of the plurality of thumbnail editions on the single display screen, wherein the plurality of thumbnail editions are placed in the layout in an order based on a user preference; and displaying the thumbnail section showing the plurality of thumbnail editions associated with the plurality of magazine editions and the preview pane showing an image from one of the plurality of magazine editions on the single display screen of the mobile device, whereby the magazine edition menu allows the user to view information of the plurality of magazine editions in the single display screen.

2. The computer-implemented method of claim 1, further comprising:

receiving an indication that an orientation of the mobile device is changing;

recalculating the size of the edition preview pane based on the new orientation;

recalculating the size of the thumbnail section based on the new orientation; and recalculating the layout of the plurality of thumbnail editions on the display screen based on the orientation.

3. The computer-implemented method of claim 1, further comprising:

determining whether the size of the thumbnail section is below a predefined threshold; and in response to determining the size of the thumbnail section is below the predefined threshold, reallocating the size of the thumbnail section to include a predetermined number of rows that include the plurality of thumbnail editions.

4. The computer-implemented method of claim 3, further comprising:

eliminating a display of the edition preview pane in response to determining the size of the thumbnail section is below the predefined threshold.

5. The computer-implemented method of claim 1, further comprising:

selecting the plurality of images for display in the edition preview pane based on credentials of the corresponding magazine editions, each image in the plurality of images included in a particular magazine edition; and displaying each image in the plurality of images on the edition preview pane for a preconfigured amount of time.

6. The computer-implemented method of claim 5, wherein a selected image is a newest image in the magazine edition.

7. The computer-implemented method of claim 5, wherein a selected image is a largest image in the magazine edition.

8. The computer-implemented method of claim 5, further comprising:
   determining whether a post associated with a selected image within the magazine edition was accessed on the mobile device; and
   in response to determining the post was accessed, selecting another image from the magazine edition for display on the edition preview pane.

9. The method of claim 8, wherein a post is one of:
   a news article, a video clip, or a blog, within a magazine edition.

10. The method of claim 1, wherein each image in the edition preview pane is selected form a post of the each corresponding magazine edition, and the method further comprises:
   detecting a user selection of an image in the edition preview pane; and
   retrieving the post that includes the selected image of the corresponding magazine edition for display.

11. The method of claim 1, wherein the order of the thumbnail editions is further based on popularity of the corresponding magazine editions, wherein the popularity of a corresponding magazine is based on the number of subscriptions of the corresponding magazine edition.

12. A system for generating a magazine edition menu to display information of a plurality of magazine editions on a single display screen of a mobile device, comprising:
   a memory;
   a processor coupled to the memory; and
   an edition player, implemented on the processor, the edition player configured to:
      querying an operating system on the mobile device to determine dimensions of the single display screen;
      based on the dimensions, determine the size of an edition preview pane, the edition preview pane displaying a plurality of images from each magazine edition of the plurality of the magazine editions;
      based on the dimensions and the size of the edition preview pane, determine the size of a thumbnail section, the thumbnail section displaying a plurality of thumbnail editions, each thumbnail edition associated with each magazine edition of the plurality of the magazine editions, wherein each thumbnail edition displays an image representing a corresponding associated magazine edition of the plurality of the magazine editions and selectable by a user to launch the corresponding associated magazine edition;
      based on the size of the thumbnail section and a number of the plurality of magazine editions, determine a layout of the plurality of thumbnail editions on the single display screen, wherein the plurality of thumbnail editions are placed in the layout in an order based on a user preference; and
      display the thumbnail section showing the plurality of thumbnail editions associated with the plurality of magazine editions and the preview pane showing an image from one of the plurality of magazine editions on the single display screen of the mobile device, whereby the magazine edition menu allows the user to view information of the plurality of magazine editions in the single display screen.

13. The system of claim 12, wherein the edition player is further configured to:
   receive an indication that an orientation of the mobile device is changing;
   recalculate the size of the edition preview pane based on the new orientation;
   recalculate the size of the thumbnail section based on the new orientation; and
   recalculate the layout of the plurality of thumbnail editions on the display screen based on the orientation.

14. The system of claim 12, wherein the edition player is further configured to:
   select the plurality of images for display on the edition preview pane based on credentials of the corresponding magazine editions, each image included in each magazine edition; and
   cause the display screen to display each image in the plurality of images on the edition preview pane for a preconfigured amount of time.

\* \* \* \* \*

UNITED STATES PATENT AND TRADEMARK OFFICE
CERTIFICATE OF CORRECTION

PATENT NO. : 9,536,012 B2  
APPLICATION NO. : 13/311234  
DATED : January 3, 2017  
INVENTOR(S) : Maurice Bennett Shore et al.

Page 1 of 1

It is certified that error appears in the above-identified patent and that said Letters Patent is hereby corrected as shown below:

In the Specification

In Column 1, Line 49, please replace "form" with --from--

In Column 3, Line 51, please replace "layout" with --lay out--

In Column 10, Line 59, please replace "layout" with --lay--

In Column 15, Line 64, please replace "form" with --from--

In the Claims

In Column 19, Line 22, please replace "form" with --from--

In Column 19, Line 41, please replace "querying" with --query--

Signed and Sealed this  
Twenty-eighth Day of February, 2017

Michelle K. Lee  
*Director of the United States Patent and Trademark Office*